United States Patent
Lake, Jr. et al.

(10) Patent No.: US 8,802,762 B2
(45) Date of Patent: Aug. 12, 2014

(54) ADDITIVE COMPOSITION AND POLYMER COMPOSITION COMPRISING THE SAME

(75) Inventors: K. David Lake, Jr., Spartanburg, SC (US); Normand P. Miron, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 151 days.

(21) Appl. No.: 13/304,646

(22) Filed: Nov. 26, 2011

(65) Prior Publication Data

US 2012/0184657 A1 Jul. 19, 2012

Related U.S. Application Data

(60) Provisional application No. 61/433,512, filed on Jan. 17, 2011.

(51) Int. Cl.
*C08K 3/30* (2006.01)
*C08K 3/32* (2006.01)

(52) U.S. Cl.
USPC .......................................... 524/423; 524/414

(58) Field of Classification Search
USPC ....................................................... 524/423
See application file for complete search history.

(56) References Cited

U.S. PATENT DOCUMENTS

| | | | |
|---|---|---|---|
| 5,036,127 | A | 7/1991 | Ueno et al. |
| 5,777,018 | A | 7/1998 | Imahashi |
| 5,925,700 | A | 7/1999 | Imahashi |
| 6,043,306 | A | 3/2000 | Imahashi |
| 6,130,282 | A | 10/2000 | Imahashi et al. |
| 6,812,275 | B1 | 11/2004 | Tai |
| 7,495,174 | B2 | 2/2009 | Hase et al. |
| 2010/0113672 | A1 | 5/2010 | Nakagawa |

FOREIGN PATENT DOCUMENTS

| | | | | |
|---|---|---|---|---|
| JP | 63-218747 | | 9/1988 | |
| JP | 63218747 | A * | 9/1988 | ............. C08L 23/00 |
| JP | 2002321231 | A * | 11/2002 | ............. B29C 39/02 |

OTHER PUBLICATIONS

Translation of JP 2002-321231, Nov. 5, 2002.*
Abstract translation of JP 63-218747, Sep. 12, 1988.*
"Aluminum hydroxide", Wikipedia (http://en.wikipedia.org/wiki/Aluminum_hydroxide), Nov. 2010.
Biron, Michel, "Halogen Free Fire Retardant Polypropylene-HFFR PP Synergistic Effects between Mineral Additives and Metal Hydroxides", SpecialChem, Nov. 24, 2008.
International Search Report for PCT/US2011/066403.

* cited by examiner

*Primary Examiner* — Hui Chin
(74) *Attorney, Agent, or Firm* — Robert M. Lanning

(57) ABSTRACT

An additive composition comprises a plurality of first particles and a metal hydroxide compound. A polymer composition comprises a polymer, a plurality of first particles, and a metal hydroxide compound. The first particles comprise a magnesium oxysulfate compound.

20 Claims, No Drawings

ADDITIVE COMPOSITION AND POLYMER COMPOSITION COMPRISING THE SAME

CROSS-REFERENCE TO RELATED PATENT APPLICATION

This application claims, pursuant to 35 U.S.C. §119(e), the benefit of the filing date of U.S. Patent Application No. 61/433,512, which was filed on Jan. 17, 2011.

TECHNICAL FIELD OF THE INVENTION

The invention relates to additive compositions suitable for use in polymer compositions and polymer compositions comprising such additive compositions.

BRIEF SUMMARY OF THE INVENTION

As noted above, the invention provides an additive composition suitable for use in plastics and a plastic composition containing such an additive composition or the individual components of such an additive composition. The additive composition of the invention is believed to be particularly well-suited for use as a flame retardant for plastics. In particular, it is believed that the additive composition of the invention can, at lower total loadings of the components, impart the same or improved levels of flame retardance relative to more traditional flame retardants (e.g., metal hydroxide compounds used alone). Furthermore, in addition to their flame retardant effects, the first particles of the additive composition are also believed to improve the stiffness of the polymer (for example, as evidenced by an increase in the 1% secant modulus of the polymer and/or an increase in the heat deflection temperature of the polymer) and to permit a reduction in the density of articles made with the polymer composition, which can be valuable when seeking to produce lighter weight articles.

In a first embodiment, the invention provides an additive composition comprising a plurality of first particles and a metal hydroxide compound. The first particles comprise a magnesium oxysulfate compound.

In a second embodiment, the invention provides a polymer composition comprising a polymer, a plurality of first particles, and a metal hydroxide compound. The first particles comprise a magnesium oxysulfate compound.

DETAILED DESCRIPTION OF THE INVENTION

In a first embodiment, the invention provides an additive composition. The additive composition comprises a plurality of first particles and a metal hydroxide compound.

The first particles comprise a magnesium oxysulfate compound. The magnesium oxysulfate compound can be comprised of any suitable relative amounts of magnesium hydroxide, magnesium sulfate, and waters of hydration. Thus, the magnesium oxysulfate compound can generally conform to the formula $xMg(OH)_2 \cdot yMgSO_4 \cdot zH_2O$, where x, y, and z are positive numbers greater than zero and ranging up to about 10. The values for x, y, and z include both integers and fractions due to the fact that the stoichiometry of the magnesium oxysulfate compound may result in, for example, magnesium hydroxide units that are "shared" by magnesium sulfate units and/or waters of hydration. In certain possibly preferred embodiments, the magnesium oxysulfate compound is selected from the group consisting of $5Mg(OH)_2 \cdot MgSO_4 \cdot 3H_2O$; $5Mg(OH)_2 \cdot MgSO_4 \cdot 2H_2O$; $3Mg(OH)_2 \cdot MgSO_4 \cdot 8H_2O$; $Mg(OH)_2 \cdot MgSO_4 \cdot 5H_2O$; $Mg(OH)_2 \cdot 2MgSO_4 \cdot 3H_2O$; and mixtures thereof. Additional forms of magnesium oxysulfate are also believed to be suitable for use in the embodiments of the invention, such as $4.34Mg(OH)_2 \cdot MgSO_4 \cdot 2H_2O$ and $Mg(OH)_2 \cdot 2MgSO_4 \cdot 2H_2O$.

The particles comprising the magnesium oxysulfate compound can be provided in any suitable form. For example, the particles can be provided in the form of spheres, plates, rods, or whiskers. The particles can have any suitable dimensions. However, the particles preferably are provided in a form in which the particles have, on average, one dimension (i.e., a length) that is substantially greater than the other two dimensions (i.e., width and height/thickness), such as plates, rods, or whiskers. Thus, in certain possibly preferred embodiments, the particles have an average aspect ratio of about 2 or more, about 3 or more, about 5 or more, or about 7 or more (e.g., about 10 or more or about 20 or more). As utilized herein, the term "aspect ratio" refers to the value obtained by dividing the length of a particle (i.e., the particle's largest dimension) by the arithmetic mean of the two remaining dimensions of the same particle (e.g., the width and height/thickness). The "average aspect ratio" is the arithmetic mean of the individual aspect ratios of the particles within a sample or collection or a statistically significant and representative random sample drawn from such a sample or collection. The aspect ratio and average aspect ratio of the particles can be determined by any suitable technique. For example, the two can be determined by measuring the dimensions of individual particles using, for example, a microscope (e.g., a scanning electron microscope) and then calculating the aspect ratio from the measured dimensions as described above.

As noted above, the particles can have any suitable dimensions. In certain possibly preferred embodiments, the particles have a length of about 1 µm or more, about 2 µm or more, about 3 µm or more, about 4 µm or more, about 5µ or more. In certain possibly preferred embodiments, the particles have a length of about 100 µm or less, about 90 µm or less, about 80 µm or less, about 70 µm or less, about 65 µm or less, or about 60 µm or less. Thus, in certain possibly preferred embodiments, the particles have a length of about 1 µm to about 100 µm, about 2 µm to about 90 µm, about 3 µm to about 80 µm, about 4 µm to about 70 µm, or about 5 µm to about 65 µm (e.g., about 5 µm to about 60 µm). The two remaining dimensions of the particle (i.e., the width and height/thickness) can be of any suitable size. In certain possibly preferred embodiments, the particles have a width of about 0.1 µm or more, about 0.2 µm or more, about 0.3 µm or more, about 0.4 µm or more, or about 0.5 µm or more. Also, in certain possibly preferred embodiments, the particles have a width of about 10 µm or less, about 9 µm or less, about 8 µm or less, about 7 µm or less, about 6 µm or less, or about 5 µm or less. Thus, in certain possibly preferred embodiments, the particles have a width of about 0.1 µm to about 10 µm, about 0.2 µm to about 9 µm, about 0.3 µm to about 8 µm, about 0.4 to about 7 µm, about 0.5 µm to about 6 µm (e.g., about 0.5 µm to about 5 µm).

The first particles can be untreated, or the first particles can be treated with one or more surface treatments according to methods known in the art. Such surface treatments include, but are not limited to, treatments which facilitate dispersion of the first particles in a polymer.

The additive composition of the invention also comprises a metal hydroxide compound. The metal hydroxide compound can be any suitable hydroxide of a metal (e.g., alkali metal, alkaline earth metal, transition metal, or post-transition metal). Furthermore, as used herein, the term "a metal hydroxide compound" also encompasses combinations of two or more metal hydroxide compounds, such as those described above. In certain possibly preferred embodiments, the metal hydroxide compound is a hydroxide of an alkaline earth metal (e.g., magnesium) or a post-transition metal (e.g., aluminum). Thus, in certain possibly preferred embodiments, the metal hydroxide compound is selected from the group consisting of magnesium hydroxide (i.e., $Mg(OH)_2$), aluminum hydroxide (i.e., $Al(OH)_3$), and mixtures thereof.

The metal hydroxide compound in the additive composition can be provided in any suitable form. For example, the metal hydroxide compound can be provided in the form of a powder, granules, pellets, flakes, etc. Furthermore, the metal hydroxide compound can be untreated, or the metal hydroxide compound can be treated with one or more surface treatments according to methods known in the art. Such surface treatments include, but are not limited to, treatments which facilitate dispersion of the metal hydroxide compound in a polymer.

The first particles and the metal hydroxide compound can be present in the additive composition in any suitable amount. In certain possibly preferred embodiments, the weight of the first particles present in the additive composition is about 15% or more of the combined total weight of the first particles and the metal hydroxide compound present in the additive composition. In certain other possibly preferred embodiments, the weight of the first particles present in the additive composition is about 20% or more (e.g., about 25% or more, about 30% or more, about 35% or more, about 40% or more, about 50% or more, about 55% or more, about 60% or more, about 65% or more, about 70% or more, about 75% or more, about 80% or more, about 85% or more, about 90% or more, or about 95% or more) of the combined total weight of the first particle and the metal hydroxide compound present in the additive composition.

In addition to the first particles and the metal hydroxide compound, the additive composition of the invention can contain other components typically found in plastic additive compositions. For example, the additive composition of the invention can contain flame retardants (e.g., phosphorous-based flame retardants, halogenated flame retardants), flame retardant synergists (e.g., antimony oxide, organoclays), nucleating agents, compatibilizers, surface treatments, coupling agents, flow aids, lubricants, antiscratch additives, antioxidants, acid scavengers, coloring agents (e.g., pigments, dyes), waxes, and oils.

While the additive composition of the invention can contain components found in other plastics additive compositions, the additive composition preferably contains only a limited amount of certain components that have been used as flame retardants. For example, in certain possibly preferred embodiments, the additive composition of the invention contains less than 1% by weight (e.g., less than 0.9% by weight, less than 0.8% by weight, less than 0.7% by weight, less than 0.6% by weight, less than 0.5% by weight, or less than 0.4% by weight) of red phosphorous based on the total weight of the additive composition. In certain other possibly preferred embodiments, the additive composition contains less than 0.3% by weight of red phosphorous based on the total weight of the additive composition.

As noted above, the additive composition of the invention is believed to be particularly useful as a flame retardant for plastics. Thus, in a second embodiment, the invention provides a polymer composition comprising an additive composition of the invention and one or more polymers. The polymer composition of the invention can be produced by adding to a polymer an additive composition such as that described above (i.e., a composition containing both the first particles and a metal hydroxide compound). Alternatively, the polymer composition of the invention can be produced by individually adding to a polymer each of the components of the additive composition described above. In other words, the polymer composition of the invention need not be produced by simultaneously adding the first particles and the metal hydroxide compound to the polymer.

In this embodiment, the polymer can be either a thermoplastic or a thermoset. Suitable thermoset polymers include, but are not necessarily limited to, phenol formaldehyde resins, urea formaldehyde resins, melamine resins, epoxy resins, polyurethane resins, polyester resins (e.g., sheet molding compound and bulk molding compound), and polyimides. Suitable thermoplastic polymers include, but are not necessarily limited to, polyamides, acrylonitrile butadiene styrene copolymers, polystyrene, and polyolefins. Suitable polyolefins include, but are not limited to, polypropylene, polyethylene, polymethylpentene, poly(but-1-ene) (i.e., polybutene-1), and polyisobutylene. Due to its widespread use, one type of polyolefin that is of particular interest is polypropylene. The polypropylene suitable for use in this embodiment of the invention includes, but is not necessarily limited to, polypropylene homopolymers, polypropylene copolymers (e.g., polypropylene random copolymers), polypropylene impact copolymers, polypropylene-containing thermoplastic polyolefins (TPOs), and combinations thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a second polymer such as ethylene-propylene rubber (EPR), ethylenepropylene-diene monomer (EPDM), polyethylene (both polyethylene homopolymers and polyethylene copolymers), elastomers, and plastomers to a polypropylene homopolymer or polypropylene random copolymer. In such polypropylene impact copolymers, the copolymer can be present in any suitable amount, but typically is present in an amount of from about 5 to about 25 wt. %. In certain possibly preferred embodiments, the polymer is a polypropylene random copolymer made from the copolymerization of propylene and ethylene, with the amount of ethylene being from about 1 to about 7 wt. %. Suitable polypropylene-containing thermoplastic polyolefins (TPOs) include, but are not limited to, those produced by the addition of polyethylene-based or polypropylene-based elastomers and/or plastomers to a polypropylene homopolymer, polypropylene random copolymer, or a polypropylene impact copolymer. The polypropylene-containing thermoplastic polyolefins (TPOs) can be created in the reactor or they can be manufactured via off-line compounding that is downstream from the polyolefin producer.

In another possibly preferred embodiment, the thermoplastic polymer can be a polyethylene. Suitable polyethylenes include, but are not limited to, low density polyethylene, linear low density polyethylene, medium density polyethylene, high density polyethylene, and combinations thereof. In certain possibly preferred embodiments, the thermoplastic polymer is selected from the group consisting of medium density polyethylene, high density polyethylene, and mixtures thereof. In another possibly preferred embodiment, the thermoplastic polymer is a high density polyethylene.

The high density polyethylene polymers suitable for use in the invention generally have a density of greater than about 0.940 g/cm$^3$. There is no upper limit to the suitable density of the polymer, but high density polyethylene polymers typically have a density that is less than about 0.980 g/cm$^3$ (e.g., less than about 0.975 g/cm$^3$).

The high density polyethylene polymers suitable for use in the invention can be either homopolymers or copolymers of ethylene with one or more α-olefins. Suitable α-olefins include, but are not limited to, 1-butene, 1-hexene, 1-octene, 1-decene, and 4-methyl-1-pentene. The comonomer can be present in the copolymer in any suitable amount, such as an amount of about 5% by weight or less (e.g., about 3 mol. % or less). As will be understood by those of ordinary skill in the art, the amount of comonomer suitable for the copolymer is largely driven by the end use for the copolymer and the required or desired polymer properties dictated by that end use.

The high density polyethylene polymers suitable for use in the invention can be produced by any suitable process. For example, the polymers can be produced by a free radical process using very high pressures as described, for example, in U.S. Pat. No. 2,816,883 (Larchar et al.), but the polymers typically are produced in a "low pressure" catalytic process. In this context, the term "low pressure" is used to denote processes carried out at pressures less than 6.9 MPa (e.g., 1,000 psig), such as 1.4-6.9 MPa (200-1,000 psig). Examples of suitable low pressure catalytic processes include, but are not limited to, solution polymerization processes (i.e., processes in which the polymerization is performed using a solvent for the polymer), slurry polymerization processes (i.e., processes in which the polymerization is performed using a hydrocarbon liquid in which the polymer does not dissolve or swell), gas-phase polymerization processes (e.g., processes in which the polymerization is performed without the use of a liquid medium or diluent), or a staged reactor polymerization process. The suitable gas-phase polymerization processes also include the so-called "condensed mode" or "super-condensed mode" processes in which a liquid hydrocarbon is introduced into the fluidized-bed to increase the absorption of the heat producing during the polymerization process. In these condensed mode and super-condensed mode processes, the liquid hydrocarbon typically is condensed in the recycle stream and reused in the reactor. The staged reactor processes can utilize a combination of slurry process reactors (tanks or loops) that are connected in series, parallel, or a combination of series or parallel so that the catalyst (e.g., chromium catalyst) is exposed to more than one set of reaction conditions. Staged reactor processes can also be carried out by combining two loops in series, combining one or more tanks and loops in series, using multiple gas-phase reactors in series, or a loop-gas phase arrangement. Because of their ability to expose the catalyst to different sets of reactor conditions, staged reactor processes are often used to produce multimodal polymers, such as those discussed below. Suitable processes also include those in which utilize a pre-polymerization step is performed. In this pre-polymerization step, the catalyst typically is exposed to the cocatalyst and ethylene under mild conditions in a smaller, separate reactor, and the polymerization reaction is allowed to proceed until the catalyst comprises a relatively small amount (e.g., about 5% to about 30% of the total weight) of the resulting composition. This pre-polymerized catalyst is then introduced to the large-scale reactor in which the polymerization is to be performed.

The high density polyethylene polymers suitable for use in the invention can be produced using any suitable catalyst or combination of catalysts. Suitable catalysts include transition metal catalysts, such as supported reduced molybdenum oxide, cobalt molybdate on alumina, chromium oxide, and transition metal halides. Chromium oxide catalysts typically are produced by impregnating a chromium compound onto a porous, high surface area oxide carrier, such as silica, and then calcining it in dry air at 500-900° C. This converts the chromium into a hexavalent surface chromate ester or dichromate ester. The chromium oxide catalysts can be used in conjunction with metal alkyl cocatalysts, such as alkyl boron, alkyl aluminum, alkyl zinc, and alkyl lithium. Supports for the chromium oxide include silica, silica-titania, silica-alumina, alumina, and aluminophosphates. Further examples of chromium oxide catalysts include those catalysts produced by depositing a lower valent organochromium compound, such as bis(arene) Cr$^0$, allyl Cr$^{2+}$ and Cr$^{3+}$, beta stabilized alkyls of Cr$^{2+}$ and Cr$^{4+}$, and bis(cyclopentadienyl) Cr$^{2+}$, onto a chromium oxide catalyst, such as those described above. Suitable transition metal catalysts also include supported chromium catalysts such as those based on chromocene or a silylchromate (e.g., bi(trisphenylsilyl)chromate). These chromium catalysts can be supported on any suitable high surface area support such as those described above for the chromium oxide catalysts, with silica typically being used. The supported chromium catalysts can also be used in conjunction with cocatalysts, such as the metal alkyl cocatalysts listed above for the chromium oxide catalysts. Suitable transition metal halide catalysts include titanium (III) halides (e.g., titanium (III) chloride), titanium (IV) halides (e.g., titanium (IV) chloride), vanadium halides, zirconium halides, and combinations thereof. These transition metal halides are often supported on a high surface area solid, such as magnesium chloride. The transition metal halide catalysts are typically used in conjunction with an aluminum alkyl cocatalyst, such as trimethylaluminum (i.e., Al(CH$_3$)$_3$) or triethylaluminum (i.e., Al(C$_2$H$_5$)$_3$). These transition metal halides may also be used in staged reactor processes. Suitable catalysts also include metallocene catalysts, such as cyclopentadienyl titanium halides (e.g., cyclopentadienyl titanium chlorides), cyclopentadienyl zirconium halides (e.g., cyclopentadienyl zirconium chlorides), cyclopentadienyl hafnium halides (e.g., cyclopentadienyl hafnium chlorides), and combinations thereof. Metallocene catalysts based on transition metals complexed with indenyl or fluorenyl ligands are also known and can be used to produce high density polyethylene polymers suitable for use in the invention. The catalysts typically contain multiple ligands, and the ligands can be substituted with various groups (e.g., n-butyl group) or linked with bridging groups, such as —CH$_2$CH$_2$— or >SiPh$_2$. The metallocene catalysts typically are used in conjunction with a cocatalyst, such as methyl aluminoxane (i.e., (Al(CH$_3$)$_x$O$_y$)$_n$. Other cocatalysts include those described in U.S. Pat. No. 5,919,983 (Rosen et al.), U.S. Pat. No. 6,107,230 (McDaniel et al.), U.S. Pat. No. 6,632,894 (McDaniel et al.), and U.S. Pat. No. 6,300,271 (McDaniel et al). Other "single site" catalysts suitable for use in producing high density polyethylene include diimine complexes, such as those described in U.S. Pat. No. 5,891,963 (Brookhart et al.).

The high density polyethylene polymers suitable for use in the invention can have any suitable molecular weight (e.g., weight average molecular weight). For example, the weight average molecular weight of the high density polyethylene can be from 20,000 g/mol to about 1,000,000 g/mol or more. As will be understood by those of ordinary skill in the art, the suitable weight average molecular weight of the high density polyethylene will depend, at least in part, on the particular application or end use for which the polymer is destined. For example, a high density polyethylene polymer intended for blow molding applications can have a weight average molecular weight of about 100,000 g/mol to about 1,000,000 g/mol. A high density polyethylene polymer intended for pipe applications or film applications can have a weight average molecular weight of about 100,000 g/mol to about 500,000 g/mol. A high density polyethylene polymer intended for injection molding applications can have a weight average molecular weight of about 20,000 g/mol to about 80,000 g/mol. A high density polyethylene polymer intended for wire insulation applications, cable insulation applications, tape applications, or filament applications can have a weight average molecular weight of about 80,000 g/mol to about 400,000 g/mol. A high density polyethylene polymer intended for rotomolding applications can have a weight average molecular weight of about 50,000 g/mol to about 150,000 g/mol.

The high density polyethylene polymers suitable for use in the invention can also have any suitable polydispersity, which is defined as the value obtained by dividing the weight average molecular weight of the polymer by the number average molecular weight of the polymer. For example, the high density polyethylene polymer can have a polydispersity of greater than 2 to about 100. As understood by those skilled in the art, the polydispersity of the polymer is heavily influenced by the catalyst system used to produce the polymer, with the metallocene and other "single site" catalysts generally producing polymers with relatively low polydispersity and narrow molecular weight distributions and the other transition metal catalysts (e.g., chromium catalysts) producing polymer with higher polydispersity and broader molecular weight distributions. The high density polyethylene polymers suitable for use in the invention can also have a multimodal (e.g., bimodal) molecular weight distribution. For example, the polymer can have a first fraction having a relatively low molecular weight and a second fraction having a relatively high molecular weight. The difference between the weight average molecular weight of the fractions in the polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight.

The high density polyethylene polymers suitable for use in the invention can have any suitable melt index. For example, the high density polyethylene polymer can have a melt index of about 0.01 dg/min to about 40 dg/min. As with the weight average molecular weight, those of ordinary skill in the art understand that the suitable melt index for the high density polyethylene polymer will depend, at least in part, on the particular application or end use for which the polymer is destined. Thus, for example, a high density polyethylene polymer intended for blow molding applications can have a melt index of about 0.01 dg/min to about 1 dg/min. A high density polyethylene polymer intended for pipe applications or film applications can have a melt index of about 0.02 dg/min to about 0.8 dg/min. A high density polyethylene polymer intended for injection molding applications can have a melt index of about 2 dg/min to about 80 dg/min. A high density polyethylene polymer intended for rotomolding applications can have a melt index of about 0.5 dg/min to about 10 dg/min. A high density polyethylene polymer intended for tape applications can have a melt index of about 0.2 dg/min to about 4 dg/min. A high density polyethylene polymer intended for filament applications can have a melt index of about 1 dg/min to about 20 dg/min. The melt index of the polymer is measured using ASTM Standard D1238-04c.

The high density polyethylene polymers suitable for use in the invention generally do not contain high amounts of long-chain branching. The term "long-chain branching" is used to refer to branches that are attached to the polymer chain and are of sufficient length to affect the rheology of the polymer (e.g., branches of about 130 carbons or more in length). If desired for the application in which the polymer is to be used, the high density polyethylene polymer can contain small amounts of long-chain branching. However, the high density polyethylene polymers suitable for use in the invention typically contain very little long-chain branching (e.g., less than about 1 long-chain branch per 10,000 carbons, less than about 0.5 long-chain branches per 10,000 carbons, less than about 0.1 long-chain branches per 10,000 carbons, or less than about 0.01 long-chain branches per 10,000 carbons).

The medium density polyethylene polymers suitable for use in the invention generally have a density of about 0.926 g/cm$^3$ to about 0.940 g/cm$^3$. The term "medium density polyethylene" is used to refer to polymers of ethylene that have a density between that of high density polyethylene and linear low density polyethylene and contain relatively short branches, at least as compared to the long branches present in low density polyethylene polymers produced by the free radical polymerization of ethylene at high pressures.

The medium density polyethylene polymers suitable for use in the invention generally are copolymers of ethylene and at least one α-olefin, such as 1-butene, 1-hexene, 1-octene, 1-decene, and 4-methyl-1-pentene. The α-olefin comonomer can be present in any suitable amount, but typically is present in an amount of less than about 8% by weight (e.g., less than about 5 mol %). As will be understood by those of ordinary skill in the art, the amount of comonomer suitable for the copolymer is largely driven by the end use for the copolymer and the required or desired polymer properties dictated by that end use.

The medium density polyethylene polymers suitable for use in the invention can be produced by any suitable process. Like the high density polyethylene polymers, the medium density polyethylene polymers typically are produced in "low pressure" catalytic processes such as any of the processes described above in connection with the high density polyethylene polymers suitable for use in the invention. Examples of suitable processes include, but are not limited to, gas-phase polymerization processes, solution polymerization processes, slurry polymerization processes, and staged reactor processes. Suitable staged reactor processes can incorporate any suitable combination of the gas-phase, solution, and slurry polymerization processes described above. As with high density polyethylene polymers, staged reactor processes are often used to produce multimodal polymers.

The medium density polyethylene polymers suitable for use in the invention can be produced using any suitable catalyst or combination of catalysts. For example, the polymers can be produced using Ziegler catalysts, such as transition metal (e.g., titanium) halides or esters used in combination with organoaluminum compounds (e.g., triethylaluminum). These Ziegler catalysts can be supported on, for example, magnesium chloride, silica, alumina, or magnesium oxide. The medium density polyethylene polymers suitable for use in the invention can also be produced using so-called "dual Ziegler catalysts," which contain one catalyst species for dimerizing ethylene into 1-butene (e.g., a combination of a titanium ester and triethylaluminum) and another catalyst for copolymerization of ethylene and the generated 1-butene (e.g., titanium chloride supported on magnesium chloride). The medium density polyethylene polymers suitable for use in the invention can also be produced using chromium oxide catalysts, such as those produced by depositing a chromium compound onto a silica-titania support, oxidizing the resulting catalyst in a mixture of oxygen and air, and then reducing the catalyst with carbon monoxide. These chromium oxide catalysts typically are used in conjunction with cocatalysts such as trialkylboron or trialkylaluminum compounds. The chromium oxide catalysts can also be used in conjunction with a Ziegler catalyst, such as a titanium halide- or titanium ester-based catalyst. The medium density polyethylene polymers suitable for use in the invention can also be produced using supported chromium catalysts such as those described above in the discussion of catalysts suitable for making high density polyethylene. The medium density polyethylene polymers suitable for use in the invention can also be produced using metallocene catalysts. Several different types of metallocene catalysts can be used. For example, the metallocene catalyst can contain a bis(metallocene) complex of zirconium, titanium, or hafnium with two cyclopentadienyl rings and methylaluminoxane. As with the catalysts used in high density polyethylene production, the ligands can be substituted with various groups (e.g., n-butyl group) or linked with bridging groups. Another class of metallocene catalysts that can be used are composed of bis(metallocene) complexes of zirconium or titanium and anions of perfluorinated boron-aromatic compounds. A third class of metallocene catalysts that can be used are referred to as constrained-geometry catalysts and contain monocyclopentadienyl derivatives of titanium or zirconium in which one of the carbon atoms in the cyclopentadienyl ring is linked to the metal atom by a bridging group. These complexes are activated by reacting them with methylaluminoxane or by forming ionic complexes with noncoordinative anions, such as $B(C_6F_5)_4^-$ or $B(C_6F_5)_3CH_3^-$. A fourth class of metallocene catalysts that can be used are metallocene-based complexes of a transition metal, such as titanium, containing one cyclopentadienyl ligand in combination with another ligand, such as a phosphinimine or $—O—SiR_3$. This class of metallocene catalyst is also activated with methylaluminoxane or a boron compound. Other catalysts suitable for use in making the linear low density polyethylene suitable for use in the invention include, but are not limited to, the catalysts disclosed in U.S. Pat. No. 6,649,558.

The medium density polyethylene polymers suitable for use in the invention can have any suitable compositional uniformity, which is a term used to describe the uniformity of the branching in the copolymer molecules of the polymer. Many commercially-available medium density polyethylene polymers have a relatively low compositional uniformity in which the high molecular weight fraction of the polymer contains relatively little of the α-olefin comonomer and has relatively little branching while the low molecular weight fraction of the polymer contains a relatively high amount of the α-olefin comonomer and has a relatively large amount of branching. Alternatively, another set of medium density polyethylene polymers have a relatively low compositional uniformity in which the high molecular weight fraction of the polymer contains a relatively high amount of the α-olefin comonomer while the low molecular weight fraction of the polymer contains relatively little of the α-olefin comonomer. The compositional uniformity of the polymer can be measured using any suitable method, such as temperature rising elution fractionation.

The medium density polyethylene polymers suitable for use in the invention can have any suitable molecular weight. For example, the polymer can have a weight average molecular weight of about 50,000 g/mol to about 200,000 g/mol. As will be understood by those of ordinary skill in the art, the suitable weight average molecular weight of the medium density polyethylene will depend, at least in part, on the particular application or end use for which the polymer is destined.

The medium density polyethylene polymers suitable for use in the invention can also have any suitable polydispersity. Many commercially available medium density polyethylene polymers have a polydispersity of about 2 to about 30. The medium density polyethylene polymers suitable for use in the invention can also have a multimodal (e.g., bimodal) molecular weight distribution. For example, the polymer can have a first fraction having a relatively low molecular weight and a second fraction having a relatively high molecular weight. As with the high density polyethylene polymers suitable for use in the invention, the difference between the weight average molecular weight of the fractions in the multimodal medium density polyethylene polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight The medium density polyethylene polymers suitable for use in the invention can have any suitable melt index. For example, the medium density polyethylene polymer can have a melt index of about 0.01 dg/min to about 200 dg/min. As with the weight average molecular weight, those of ordinary skill in the art understand that the suitable melt index for the medium density polyethylene polymer will depend, at least in part, on the particular application or end use for which the polymer is destined. Thus, for example, a medium density polyethylene polymer intended for blow molding applications or pipe applications can have a melt index of about 0.01 dg/min to about 1 dg/min. A medium density polyethylene polymer intended for film applications can have a melt index of about 0.5 dg/min to about 3 dg/min. A medium density polyethylene polymer intended for injection molding applications can have a melt index of about 6 dg/min to about 200 dg/min. A medium density polyethylene polymer intended for rotomolding applications can have a melt index of about 4 dg/min to about 7 dg/min. A medium density polyethylene polymer intended for wire and cable insulation applications can have a melt index of about 0.5 dg/min to about 3 dg/min. The melt index of the polymer is measured using ASTM Standard D1238-04c.

The medium density polyethylene polymers suitable for use in the invention generally do not contain a significant amount of long-chain branching. For example, the medium density polyethylene polymers suitable for use in the invention generally contain less than about 0.1 long-chain branches per 10,000 carbon atoms (e.g., less than about 0.002 long-chain branches per 100 ethylene units) or less than about 0.01 long-chain branches per 10,000 carbon atoms.

The linear low density polyethylene polymers suitable for use in the invention generally have a density of 0.925 g/cm$^3$ or less (e.g., about 0.910 g/cm$^3$ to about 0.925 g/cm$^3$). The term "linear low density polyethylene" is used to refer to lower density polymers of ethylene having relatively short branches, at least as compared to the long branches present in low density polyethylene polymers produced by the free radical polymerization of ethylene at high pressures.

The linear low density polyethylene polymers suitable for use in the invention generally are copolymers of ethylene and at least one α-olefin, such as 1-butene, 1-hexene, 1-octene, 1-decene, and 4-methyl-1-pentene. The α-olefin comonomer can be present in any suitable amount, but typically is present in an amount of less than about 6 mol. % (e.g., about 2 mol % to about 5 mol %). As will be understood by those of ordinary skill in the art, the amount of comonomer suitable for the copolymer is largely driven by the end use for the copolymer and the required or desired polymer properties dictated by that end use.

The linear low density polyethylene polymers suitable for use in the invention can be produced by any suitable process. Like the high density polyethylene polymers, the linear low density polyethylene polymers typically are produced in "low pressure" catalytic processes such as any of the processes described above in connection with the high density polyethylene polymers suitable for use in the invention. Suitable processes include, but are not limited to, gas-phase polymerization processes, solution polymerization processes, slurry polymerization processes, and staged reactor processes. Suitable staged reactor processes can incorporate any suitable combination of the gas-phase, solution, and slurry polymerization processes described above. As with high density polyethylene polymers, staged reactor processes are often used to produce multimodal polymers.

The linear low density polyethylene polymers suitable for use in the invention can be produced using any suitable catalyst or combination of catalysts. For example, the polymers can be produced using Ziegler catalysts, such as transition metal (e.g., titanium) halides or esters used in combination with organoaluminum compounds (e.g., triethylaluminum). These Ziegler catalysts can be supported on, for example, magnesium chloride, silica, alumina, or magnesium oxide. The linear low density polyethylene polymers suitable for use in the invention can also be produced using so-called "dual Ziegler catalysts," which contain one catalyst species for dimerizing ethylene into 1-butene (e.g., a combination of a titanium ester and triethylaluminum) and another catalyst for copolymerization of ethylene and the generated 1-butene (e.g., titanium chloride supported on magnesium chloride). The linear low density polyethylene polymers suitable for use in the invention can also be produced using chromium oxide catalysts, such as those produced by depositing a chromium compound onto a silica-titania support, oxidizing the resulting catalyst in a mixture of oxygen and air, and then reducing the catalyst with carbon monoxide. These chromium oxide catalysts typically are used in conjunction with cocatalysts such as trialkylboron or trialkylaluminum compounds. The chromium oxide catalysts can also be used in conjunction with a Ziegler catalyst, such as a titanium halide- or titanium ester-based catalyst. The linear low density polyethylene polymers suitable for use in the invention can also be produced using supported chromium catalysts such as those described above in the discussion of catalysts suitable for making high density polyethylene. The linear low density polyethylene suitable for use in the invention can also be produced using metallocene catalysts. Several different types of metallocene catalysts can be used. For example, the metallocene catalyst can contain a bis(metallocene) complex of zirconium, titanium, or hafnium with two cyclopentadienyl rings and methylaluminoxane. As with the catalysts used in high density polyethylene production, the ligands can be substituted with various groups (e.g., n-butyl group) or linked with bridging groups. Another class of metallocene catalysts that can be used are composed of bis(metallocene) complexes of zirconium or titanium and anions of perfluorinated boronaromatic compounds. A third class of metallocene catalysts that can be used are referred to as constrained-geometry catalysts and contain monocyclopentadienyl derivatives of titanium or zirconium in which one of the carbon atoms in the cyclopentadienyl ring is linked to the metal atom by a bridging group. These complexes are activated by reacting them with methylaluminoxane or by forming ionic complexes with noncoordinative anions, such as $B(C_6F_5)_4^-$ or $B(C_6F_5)_3CH_3^-$. A fourth class of metallocene catalysts that can be used are metallocene-based complexes of a transition metal, such as titanium, containing one cyclopentadienyl ligand in combination with another ligand, such as a phosphinimine or —O—SiR$_3$. This class of metallocene catalyst is also activated with methylaluminoxane or a boron compound. Other catalysts suitable for use in making the linear low density polyethylene suitable for use in the invention include, but are not limited to, the catalysts disclosed in U.S. Pat. No. 6,649,558.

The linear low density polyethylene polymers suitable for use in the invention can have any suitable compositional uniformity, which is a term used to describe the uniformity of the branching in the copolymer molecules of the polymer. Many commercially-available linear low density polyethylene polymers have a relatively low compositional uniformity in which the high molecular weight fraction of the polymer contains relatively little of the α-olefin comonomer and has relatively little branching while the low molecular weight fraction of the polymer contains a relatively high amount of the α-olefin comonomer and has a relatively large amount of branching. Alternatively, another set of linear low density polyethylene polymers have a relatively low compositional uniformity in which the high molecular weight fraction of the polymer contains a relatively high amount of the α-olefin comonomer while the low molecular weight fraction of the polymer contains relatively little of the α-olefin comonomer. The compositional uniformity of the polymer can be measured using any suitable method, such as temperature rising elution fractionation.

The linear low density polyethylene polymers suitable for use in the invention can have any suitable molecular weight. For example, the polymer can have a weight average molecular weight of about 20,000 g/mol to about 250,000 g/mol. As will be understood by those of ordinary skill in the art, the suitable weight average molecular weight of the linear low density polyethylene will depend, at least in part, on the particular application or end use for which the polymer is destined.

The linear low density polyethylene polymers suitable for use in the invention can also have any suitable polydispersity. Many commercially available linear low density polyethylene polymers have a relatively narrow molecular weight distribution and thus a relatively low polydispersity, such as about 2 to about 5 (e.g., about 2.5 to about 4.5 or about 3.5 to about 4.5). The linear low density polyethylene polymers suitable for use in the invention can also have a multimodal (e.g., bimodal) molecular weight distribution. For example, the polymer can have a first fraction having a relatively low molecular weight and a second fraction having a relatively high molecular weight. As with the high density polyethylene polymers suitable for use in the invention, the difference between the weight average molecular weight of the fractions in the multimodal linear low density polyethylene polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight The linear low density polyethylene polymers suitable for use in the invention can have any suitable melt index. For example, the linear low density polyethylene polymer can have a melt index of about 0.01 dg/min to about 200 dg/min. As with the weight average molecular weight, those of ordinary skill in the art understand that the suitable melt index for the linear low density polyethylene polymer will depend, at least in part, on the particular application or end use for which the polymer is destined. Thus, for example, a linear low density polyethylene polymer intended for blow molding applications or pipe applications can have a melt index of about 0.01 dg/min to about 1 dg/min. A linear low density polyethylene polymer intended for film applications can have a melt index of about 0.5 dg/min to about 3 dg/min. A linear low density polyethylene polymer intended for injection molding applications can have a melt index of about 6 dg/min to about 200 dg/min. A linear low density polyethylene polymer intended for rotomolding applications can have a melt index of about 4 dg/min to about 7 dg/min. A linear low density polyethylene polymer intended for wire and cable insulation applications can have a melt index of about 0.5 dg/min to about 3 dg/min. The melt index of the polymer is measured using ASTM Standard D1238-04c.

The linear low density polyethylene polymers suitable for use in the invention generally do not contain a significant amount of long-chain branching. For example, the linear low density polyethylene polymers suitable for use in the invention generally contain less than about 0.1 long-chain branches per 10,000 carbon atoms (e.g., less than about 0.002 long-chain branches per 100 ethylene units) or less than about 0.01 long-chain branches per 10,000 carbon atoms.

The low density polyethylene polymers suitable for use in the invention generally have a density of less than 0.935 g/cm$^3$ and, in contrast to high density polyethylene, medium density polyethylene and linear low density polyethylene, have a relatively large amount of long-chain branching in the polymer.

The low density polyethylene polymers suitable for use in the invention can be either ethylene homopolymers or copolymers of ethylene and a polar comonomer. Suitable polar comonomers include, but are not limited to, vinyl acetate, methyl acrylate, ethyl acrylate, and acrylic acid. These comonomers can be present in any suitable amount, with comonomer contents as high as 20% by weight being used for certain applications. As will be understood by those skilled in the art, the amount of comonomer suitable for the polymer is largely driven by the end use for the polymer and the required or desired polymer properties dictated by that end use.

The low density polyethylene polymers suitable for use in the invention can be produced using any suitable process, but typically the polymers are produced by the free-radical initiated polymerization of ethylene at high pressure (e.g., about 81 to about 276 MPa) and high temperature (e.g., about 130 to about 330° C.). Any suitable free radical initiator can be used in such processes, with peroxides and oxygen being the most common. The free-radical polymerization mechanism gives rise to short-chain branching in the polymer and also to the relatively high degree of long-chain branching that distinguishes low density polyethylene from other ethylene polymers (e.g., high density polyethylene and linear low density polyethylene). The polymerization reaction typically is performed in an autoclave reactor (e.g., a stirred autoclave reactor), a tubular reactor, or a combination of such reactors positioned in series.

The low density polyethylene polymers suitable for use in the invention can have any suitable molecular weight. For example, the polymer can have a weight average molecular weight of about 30,000 g/mol to about 500,000 g/mol. As will be understood by those of ordinary skill in the art, the suitable weight average molecular weight of the low density polyethylene will depend, at least in part, on the particular application or end use for which the polymer is destined. For example, a low density polyethylene polymer intended for blow molding applications can have a weight average molecular weight of about 80,000 g/mol to about 200,000 g/mol. A low density polyethylene polymer intended for pipe applications can have a weight average molecular weight of about 80,000 g/mol to about 200,000 g/mol. A low density polyethylene polymer intended for injection molding applications can have a weight average molecular weight of about 30,000 g/mol to about 80,000 g/mol. A low density polyethylene polymer intended for film applications can have a weight average molecular weight of about 60,000 g/mol to about 500,000 g/mol.

The low density polyethylene polymers suitable for use in the invention can have any suitable melt index. For example, the low density polyethylene polymer can have a melt index of about 0.2 to about 100 dg/min. As noted above, the melt index of the polymer is measured using ASTM Standard D1238-04c.

As noted above, one of the major distinctions between low density polyethylene and other ethylene polymers is a relatively high degree of long-chain branching within the polymer. The low density polyethylene polymers suitable for use in the invention can exhibit any suitable amount of long-chain branching, such as about 0.01 or more long-chain branches per 10,000 carbon atoms, about 0.1 or more long-chain branches per 10,000 carbon atoms, about 0.5 or more long-chain branches per 10,000 carbon atoms, about 1 or more long-chain branches per 10,000 carbon atoms, or about 4 or more long-chain branches per 10,000 carbon atoms. While there is not a strict limit on the maximum extent of long-chain branching that can be present in the low density polyethylene polymers suitable for use in the invention, the long-chain branching in many low density polyethylene polymers is less than about 100 long-chain branches per 10,000 carbon atoms.

In this second embodiment, the additive composition and the polymer can be present in any suitable amount. In certain possibly preferred embodiments, the combined weight of the first particles and the metal hydroxide compound present in the polymer composition is about 10% or more (e.g., about 15% or more, about 20% or more, about 25% or more, about 30% or more) of the total weight of the polymer composition. While the flame resistance of the polymer composition generally increases with increasing amounts of the first particles and the metal hydroxide compound, high levels of the particles and metal hydroxide compound can produce a composition exhibiting undesirable physical properties. Accordingly, in certain possibly preferred embodiments, the combined weight of the first particle and the metal hydroxide compound present in the polymer composition is about 90% or less (e.g., about 85% or less, about 80% or less, about 75% or less, about 70% or less, about 65% or less, or about 60% or less) of the total weight of the polymer composition. Thus, in certain possibly preferred embodiments, the combined weight of the first particles and the metal hydroxide compound present in the polymer composition is about 25% to about 75% (e.g., about 30% to about 70%) of the total weight of the polymer composition.

The polymer composition of the invention is believed to be particularly well-suited for use in producing articles intended for applications that require flame resistance. For example, the polymer composition of the invention is believed to be particularly well-suited for use in making coatings (e.g., insulation layers) used in wire and cable applications and in roofing and siding used in the building and construction industries.

Example 1

This example demonstrates the preparation of and physical properties exhibited by an additive composition and polymer composition according to the invention. Twenty-five (25) polypropylene polymer compositions were prepared using a commercially-available reactor flake medium impact copolymer polypropylene resin (LyondellBasell Pro-fax SD375S polypropylene resin) that has been stabilized with approximately 500 ppm of Irganox® 1010 and approximately 1,000 ppm of Irgafos® 168. The polymer compositions were prepared by blending the amounts of magnesium oxysulfate particles (Hyperform® HPR-803 reinforcing agent from Milliken & Company) and/or magnesium hydroxide particles (Vertex® 60 HST from Huber) indicated in Table 1 below with the polypropylene resin.

In particular, the samples containing the magnesium oxysulfate particles and/or magnesium hydroxide particles were compounded and pelletized on a Leistritz 27 mm co-rotating twin screw extruder. In each case, the resin was fed into the extruder throat (Zone 0) while the magnesium oxysulfate particles and/or magnesium hydroxide particles were side-fed downstream into Zone 3. For those samples containing both magnesium oxysulfate particles and magnesium hydroxide particles, the magnesium oxysulfate particles and metal hydroxide particles were tumble-blended together into a homogeneous powder mixture prior to side-feeding. The feed rate into the Zone 3 stuffer was controlled by a K-Tron 20 mm twin screw gravimetric feeder equipped with coarse auger feed screws. The hopper was equipped with a 4 blade agitator. The molten polymer compositions were extruded through a 3-hole die, quenched in a water bath, blown dry, and strand pelletized.

The resulting polymer compositions were then tested to determine the melt flow rate (MRF) exhibited by each polymer composition. In particular, the melt flow rate for each polymer composition was determined in accordance with the procedure described in ASTM D1238 using a 2.16 kg weight at 230° C.

Portions of the resulting polymer compositions were then injection molded into ASTM bars having nominal dimensions of 127 mm×12.7 mm×3.2 mm on a 40 ton Arburg press using a flat 230° C. barrel profile. The resulting bars were then tested in accordance with ASTM D790-10 Procedure B to determine the flexural properties (specifically, the 1% secant modulus expressed in MPa) exhibited by each polymer composition. The resulting bars were also tested in accordance with ASTM D648-07 Method B to determine the heat deflection temperature (expressed in ° C.) exhibited by each polymer composition.

Portions of the resulting polymer compositions were also injected molded into plaques having dimensions of 154 mm (±2 mm) in length, 100 mm (±1 mm) in width, and 3.2 mm (±0.03 mm) in thickness. These plaques were then used to test the horizontal flammability of the polymer compositions in accordance with ISO 3795.

The results of the melt flow rate tests, the flexural tests, the heat deflection tests (HDT), and the horizontal flammability (Hor. Flam. tests are reported in Table 1 below. Table 1 also reports the amount of magnesium oxysulfate particles (HPR wt. %) and the amount of magnesium hydroxide particles (MDH wt. %) used to prepare each polymer composition.

TABLE 1

Filler loading and content, melt flow rate, flexural modulus, heat deflection temperature, and horizontal flammability of Samples 1-25.

| Sample | Filler Loading (wt. %) | HPR wt. % | MDH wt. % | MFR (g/10 min) | 1% Secant Modulus (MPa) | HDT (° C.) | Hor. Flam. (mm/min) |
|---|---|---|---|---|---|---|---|
| 1 | 0 | 0 | 0 | 22.6 | 1104 | 81.4 | 27 |
| 2 | 20 | 20 | 0 | 12.4 | 2945 | 137.6 | 29 |
| 3 | 35 | 35 | 0 | 1.5 | 3893 | 143.7 | 7 |
| 4 | 50 | 50 | 0 | 0.9 | 4673 | 151.7 | 5 |
| 5 | 65 | 65 | 0 | <0.1 | 4569 | 150.0 | 0 |
| 6 | 20 | 16 | 4 | 14.0 | 2655 | 127.7 | 30 |
| 7 | 35 | 28 | 7 | 3.4 | 3714 | 139.7 | 8 |
| 8 | 50 | 40 | 10 | 0.2 | 4148 | 148.4 | 0 |
| 9 | 65 | 52 | 13 | <0.1 | 3993 | 150.9 | 0 |
| 10 | 20 | 12 | 8 | 16.6 | 2493 | 119.9 | 36 |
| 11 | 35 | 21 | 14 | 9.3 | 3241 | 131.0 | 9 |
| 12 | 50 | 30 | 20 | 0.2 | 3768 | 137.9 | 4 |
| 13 | 65 | 39 | 26 | <0.1 | 3925 | 141.6 | 0 |
| 14 | 20 | 8 | 12 | 16.1 | 2158 | 110.1 | 37 |
| 15 | 35 | 14 | 21 | 13.4 | 2671 | 120.7 | 21 |
| 16 | 50 | 20 | 30 | 4.1 | 3025 | 124.1 | 0 |
| 17 | 65 | 26 | 39 | <0.1 | 3500 | 132.5 | 0 |
| 18 | 20 | 4 | 16 | 18.0 | 1712 | 100.2 | 36 |
| 19 | 35 | 7 | 28 | 17.2 | 2117 | 107.5 | 31 |
| 20 | 50 | 10 | 40 | 13.4 | 2576 | 114.9 | 22 |
| 21 | 65 | 13 | 52 | 3.6 | 3177 | 124.6 | 0 |
| 22 | 20 | 0 | 20 | 18.1 | 1417 | 86.5 | 31 |

TABLE 1-continued

Filler loading and content, melt flow rate, flexural modulus, heat deflection temperature, and horizontal flammability of Samples 1-25.

| Sample | Filler Loading (wt. %) | HPR wt. % | MDH wt. % | MFR (g/10 min) | 1% Secant Modulus (MPa) | HDT (° C.) | Hor. Flam. (mm/min) |
|---|---|---|---|---|---|---|---|
| 23 | 35 | 0 | 35 | 18.0 | 1818 | 92.6 | 32 |
| 24 | 50 | 0 | 50 | 13.0 | 2247 | 100.8 | 21 |
| 25 | 65 | 0 | 65 | 8.5 | 2768 | 109.1 | 0 |

As can be seen from the results set forth in the Table 1, the polymer compositions containing a combination of magnesium oxysulfate particles and magnesium hydroxide particles exhibited a desirable combination of good flexural properties, high heat deflection temperature, and low horizontal flammability. Applicants believe these benefits are especially pronounced in the polymer compositions having a total filler content greater than 20 wt. % (e.g., 35 wt. % or higher) in which the magnesium oxysulfate particles make up about 20% or more of the combined total weight of the magnesium oxysulfate particles and the magnesium hydroxide particles. Furthermore, Applicants believe these results demonstrate that the polymer compositions containing a combination of magnesium oxysulfate particles and magnesium hydroxide particles are able to achieve a desirable combination of features at lower total filler loadings than are required when magnesium oxysulfate particles or magnesium hydroxide particles are used alone.

Example 2

This example demonstrates the preparation of and physical properties exhibited by an additive composition and polymer composition according to the invention. Thirteen (13) polyethylene polymer compositions were prepared using a commercially-available high-density polyethylene resin (ExxonMobil 6719) having a density of 0.952 g/cm³. The polymer compositions were prepared by blending the amounts of magnesium oxysulfate particles (Hyperform® HPR-803 reinforcing agent from Milliken & Company) and/or aluminum hydroxide particles (Martinal OL-104 LEO from Albemarle) indicated in Table 2 below with the polyethylene resin.

In particular, the samples containing the magnesium oxysulfate particles and/or aluminum hydroxide particles were compounded and pelletized on a Leistritz 27 mm co-rotating twin screw extruder. In each case, the resin was fed into the extruder throat (Zone 0) while the magnesium oxysulfate particles and/or aluminum hydroxide particles were side-fed downstream into Zone 3. For those samples containing both magnesium oxysulfate particles and aluminum hydroxide particles, the magnesium oxysulfate particles and aluminum hydroxide particles were tumble-blended together into a homogeneous powder mixture prior to side-feeding. The feed rate into the Zone 3 stuffer was controlled by a K-Tron 20 mm twin screw gravimetric feeder equipped with coarse auger feed screws. The hopper was equipped with a 4 blade agitator. The molten polymer compositions were extruded through a 3-hole die, quenched in a water bath, blown dry, and strand pelletized.

The resulting polymer compositions were then tested to determine the melt flow rate (MRF) exhibited by each polymer composition. In particular, the melt flow rate for each polymer composition was determined in accordance with the procedure described in ASTM D1238 using a 2.16 kg weight at 190° C.

Portions of the resulting polymer compositions were then injection molded into ASTM bars having nominal dimensions of 127 mm×12.7 mm×3.2 mm on a 40 ton Arburg press using a flat 175° C. barrel profile. The resulting bars were then tested in accordance with ASTM D790-10 Procedure B to determine the flexural properties (specifically, the 1% secant modulus expressed in MPa) exhibited by each polymer composition. The resulting bars were also tested in accordance with ASTM D648-07 Method B to determine the heat deflection temperature (expressed in ° C.) exhibited by each polymer composition.

Portions of the resulting polymer compositions were also injected molded into plaques having dimensions of 154 mm (±2 mm) in length, 100 mm (±1 mm) in width, and 3.2 mm (±0.03 mm) in thickness. These plaques were then used to test the horizontal flammability of the polymer compositions in accordance with ISO 3795.

The results of the melt flow rate tests, the flexural tests, the heat deflection tests (HDT), and the horizontal flammability (Hor. Flam.) tests are reported in Table 2 below. Table 2 also reports the amount of magnesium oxysulfate particles (% HPR) and the amount of aluminum hydroxide particles (% ATH) used to prepare each polymer composition.

TABLE 2

Filler loading and content, melt flow rate, flexural modulus, heat deflection temperature, and horizontal flammability of Samples 26-38.

| Sample | Filler Loading (wt. %) | HPR wt. % | ATH wt. % | MFR (g/10 min) | 1% Secant Modulus (MPa) | HDT (° C.) | Hor. Flam. (mm/min) |
|---|---|---|---|---|---|---|---|
| 26 | 0 | 0 | 0 | 16.0 | 766 | 60.0 | 27 |
| 27 | 20 | 20 | 0 | 10.3 | 1977 | 100.1 | 30 |
| 28 | 35 | 35 | 0 | 2.6 | 3070 | 113.5 | 5 |
| 29 | 50 | 50 | 0 | 0.9 | 3892 | 119.4 | 0 |
| 30 | 65 | 65 | 0 | <0.1 | 4986 | 122.6 | 0 |
| 31 | 20 | 12 | 8 | 11.3 | 1673 | 89.4 | 38 |
| 32 | 35 | 21 | 14 | 3.2 | 2481 | 108.6 | 9 |
| 33 | 50 | 30 | 20 | 0.2 | 3499 | 118.9 | 0 |
| 34 | 65 | 39 | 26 | <0.1 | No test | 121.5 | 0 |
| 35 | 20 | 0 | 20 | 16.3 | 1087 | 69.4 | 28 |
| 36 | 35 | 0 | 35 | 17.3 | 1348 | 79.6 | 28 |
| 37 | 50 | 0 | 50 | 8.8 | 1838 | 92.9 | 20 |
| 38 | 65 | 0 | 65 | 1.5 | 2784 | 108.8 | 0 |

As can be seen from the results set forth in the Table 2, the polymer compositions containing a combination of magnesium oxysulfate particles and magnesium hydroxide particles exhibited a desirable combination of good flexural properties, high heat deflection temperature, and low horizontal flammability. Applicants believe these benefits are especially pronounced in the polymer compositions having a total filler content greater than 20 wt. % (e.g., 35 wt. % or higher). Furthermore, Applicants believe these results demonstrate that the polymer compositions containing a combination of magnesium oxysulfate particles and magnesium hydroxide particles are able to achieve a desirable combination of features at lower total filler loadings than are required when magnesium oxysulfate particles or aluminum hydroxide particles are used alone.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims)

are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. An additive composition comprising:
    (a) a plurality of first particles, the first particles comprising a magnesium oxysulfate compound; and
    (b) a metal hydroxide compound,
    wherein the weight of the first particles present in the additive composition is about 30% or more of the combined total weight of the first particles and the metal hydroxide compound present in the additive composition, and wherein the additive composition contains less than 0.3% by weight of red phosphorous based on the total weight of the additive composition.

2. The additive composition of claim 1, wherein the particles comprise a magnesium oxysulfate compound selected from the group consisting of $5Mg(OH)_2 \cdot MgSO_4 \cdot 3H_2O$; $5Mg(OH)_2 \cdot MgSO_4 \cdot 2H_2O$; $3Mg(OH)_2 \cdot MgSO_4 \cdot 8H_2O$; $Mg(OH)_2 \cdot MgSO_4 \cdot 5H_2O$; $Mg(OH)_2 \cdot 2MgSO_4 \cdot 3H_2O$; and mixtures thereof.

3. The additive composition of claim 1, wherein at least a portion of the particles are in the form of whiskers, the whiskers having an average aspect ratio of about 7 or more.

4. The additive composition of claim 1, wherein the metal hydroxide compound is selected from the group consisting of magnesium hydroxide, aluminum hydroxide, and mixtures thereof.

5. The additive composition of claim 4, wherein the metal hydroxide compound is magnesium hydroxide.

6. The additive composition of claim 4, wherein the metal hydroxide compound is aluminum hydroxide.

7. The additive composition of claim 1, wherein the weight of the first particles present in the additive composition is about 35% or more of the combined total weight of the first particles and the metal hydroxide compound present in the additive composition.

8. A polymer composition comprising:
    (a) a polymer;
    (b) a plurality of first particles, the particles comprising a magnesium oxysulfate compound; and
    (c) a metal hydroxide compound,
    wherein the weight of the first particles present in the polymer composition is about 30% or more of the combined total weight of the first particles and the metal hydroxide compound present in the polymer composition, and wherein the polymer composition contains less than 0.3% by weight of red phosphorous based on the total weight of the polymer composition.

9. The polymer composition of claim 8, wherein the polymer is a thermoplastic polymer.

10. The polymer composition of claim 9, wherein the thermoplastic polymer is a polyolefin.

11. The polymer composition of claim 10, wherein the polyolefin is selected from the group consisting of polypropylene, polyethylene, and mixtures thereof.

12. The polymer composition of claim 8, wherein the polymer is selected from the group consisting of polypropylene homopolymers, polypropylene copolymers, polypropylene impact copolymers, and mixtures thereof.

13. The polymer composition of claim 8, wherein the particles comprise a magnesium oxysulfate compound selected from the group consisting of $5Mg(OH)_2 \cdot MgSO_4 \cdot 3H_2O$; $5Mg(OH)_2 \cdot MgSO_4 \cdot 2H_2O$; $3Mg(OH)_2 \cdot MgSO_4 \cdot 8H_2O$; $Mg(OH)_2 \cdot MgSO_4 \cdot 5H_2O$; $Mg(OH)_2 \cdot 2MgSO_4 \cdot 3H_2O$; and mixtures thereof.

14. The polymer composition of claim 8, wherein at least a portion of the particles are in the form of whiskers, the whiskers having an average aspect ratio of about 7 or more.

15. The polymer composition of claim 8, wherein the metal hydroxide compound is selected from the group consisting of magnesium hydroxide, aluminum hydroxide, and mixtures thereof.

16. The polymer composition of claim 15, wherein the metal hydroxide compound is magnesium hydroxide.

17. The polymer composition of claim 15, wherein the metal hydroxide compound is aluminum hydroxide.

18. The polymer composition of claim 8, wherein the weight of the first particles present in the polymer composition is about 35% or more of the combined total weight of the first particles and the metal hydroxide compound present in the polymer composition.

19. The polymer composition of claim 8, wherein the combined weight of the first particles and the metal hydroxide compound present in the polymer composition is about 25% to about 75% of the total weight of the polymer composition.

20. The polymer composition of claim 19, wherein the combined weight of the first particles and the metal hydroxide compound present in the polymer composition is about 30% to about 70% of the total weight of the polymer composition.

* * * * *